United States Patent
Cross et al.

(10) Patent No.: US 10,320,021 B2
(45) Date of Patent: Jun. 11, 2019

(54) PASSIVE FORMIC ACID FUEL CELL

(71) Applicant: Neah Power Systems, Inc., Bothell, WA (US)

(72) Inventors: Tsali Cross, Portland, OR (US); Chris D'Couto, Edmonds, WA (US); Sean Huff, Vancouver (CA); Derek Reiman, Lynnwood, WA (US)

(73) Assignee: XNRGI, INC., Bothell, WA (US)

( * ) Notice: Subject to any disclaimer, the term of this patent is extended or adjusted under 35 U.S.C. 154(b) by 579 days.

(21) Appl. No.: 14/808,274

(22) Filed: Jul. 24, 2015

(65) Prior Publication Data

US 2016/0028098 A1 Jan. 28, 2016

Related U.S. Application Data

(60) Provisional application No. 62/028,589, filed on Jul. 24, 2014.

(51) Int. Cl.
| | |
|---|---|
| *H01M 8/1009* | (2016.01) |
| *H01M 8/04186* | (2016.01) |
| *H01M 8/04082* | (2016.01) |
| *H01M 8/2455* | (2016.01) |
| *H01M 8/1018* | (2016.01) |

(52) U.S. Cl.
CPC ..... *H01M 8/1009* (2013.01); *H01M 8/04186* (2013.01); *H01M 8/04201* (2013.01); *H01M 8/04208* (2013.01); *H01M 8/2455* (2013.01); *H01M 2008/1095* (2013.01)

(58) Field of Classification Search
CPC .......... H01M 8/1009; H01M 8/04208; H01M 8/04201; H01M 8/04186; H01M 2008/1095; H01M 8/2455
USPC ........................................................ 429/447
See application file for complete search history.

(56) References Cited

U.S. PATENT DOCUMENTS

| | | | | |
|---|---|---|---|---|
| 2004/0001991 A1* | 1/2004 | Kinkelaar | ........... | H01M 8/0239 429/414 |
| 2013/0236809 A1* | 9/2013 | Haan | ...................... | H01M 4/92 429/482 |

\* cited by examiner

*Primary Examiner* — Gary D Harris
(74) *Attorney, Agent, or Firm* — patent2ip LLC; Tue Nguyen

(57) ABSTRACT

A passive-delivery fuel cell system an anode with a fuel flow channel extending along the body and fluidly connecting the inlet to the outlet, wherein a volume of the flow channel per unit length of the anode body increases along the length of the body towards the second end, a capillary check valve in fluid communication with the anode inlet, a vented fuel cartridge in fluid communication with the anode outlet, and a pump in fluid communication with the vented fuel cartridge, the pump configured to pump fuel from the vented fuel cartridge to the inlet.

16 Claims, 7 Drawing Sheets

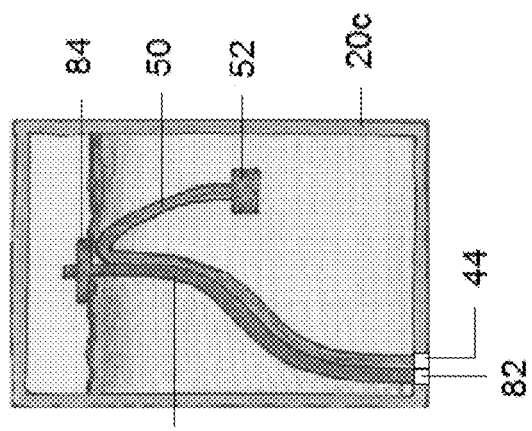
FIGURE 6(c)
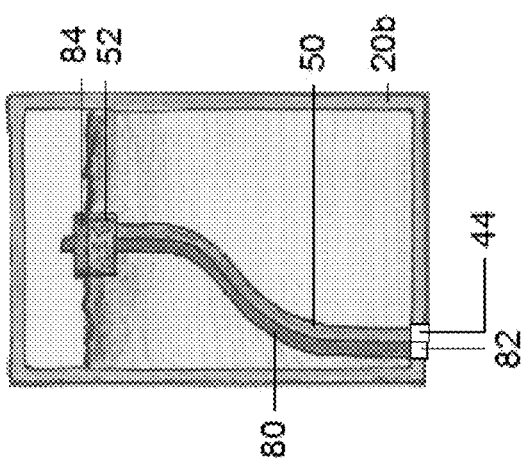
FIGURE 6(b)
FIGURE 6
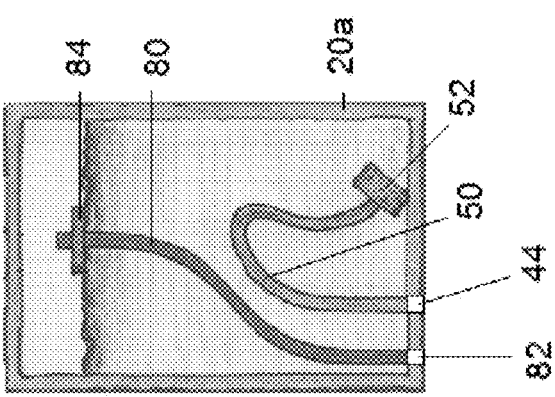
FIGURE 6(a)

PASSIVE FORMIC ACID FUEL CELL

TECHNICAL FIELD

The present disclosure relates to a passive proton exchange membrane (PEM) fuel cell, such as a passive direct formic acid fuel cell.

BACKGROUND

In PEM fuel cell systems, various hydrocarbon compounds may be used as a source of fuel. Commonly used fuels include alcohols, such as methanol and ethanol, and formic acid. Formic acid generally boasts a number of advantages over alcohol-based fuels when used in a PEM fuel cell application, including low flammability, low toxicity, good ionic conductivity, ability to generate hydrogen ions under anhydrous conditions, high mass transfer to the anode, and relatively low fuel crossover through Nafion™ membranes.

Direct formic acid fuel cell ("DFAFC") systems produce electricity through the following anodic and cathodic reactions:

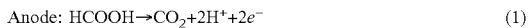
$$\text{Anode: HCOOH} \rightarrow CO_2 + 2H^+ + 2e^- \tag{1}$$

$$\text{Cathode: } \tfrac{1}{2}O_2 + 2H^+ + 2e^- \rightarrow H_2O \tag{2}$$

Prior art DFAFC system designs include systems that employ fuel "dosing" operations that use a motorized metering pump to rapidly deliver a set dose of fuel to an anode; the fuel volume is distributed across the anode due to a high inlet fuel velocity, and the fuel is wicked and retained by a series of "fuel layers" adjacent to an anode catalyst. Fuel is slowly delivered to the anode catalyst from the fuel layers until the onset of fuel starvation is detected; when fuel is depleted from the anode chamber, an anode catalyst regeneration sequence can be initiated or the metering pump can deliver more fuel. A state of fuel depletion is required to reach the target anode potential range for regeneration. Some problems with such DFAFC systems include reduced energy production between fuel doses, which necessitates onboard energy storage for bridging power, and the addition of a power supply for the anode regeneration sequence. Also, complex electronics are required for this sequence which also must be powered by electricity produced by the fuel cell.

Because the energy density of formic acid is lower than alcohol-based fuels, it is desirable to minimize or outright eliminate parasitic power loss from support components in a DFAFC, such as motorized pumps and power conversion electronics which are powered by electricity produced by the fuel cell. DFAFCs with no electrical power consuming components are herein referred to as passive fuel cells. A number of known challenges in designing passive DFAFCs, especially those that use relatively high concentrations of formic acid, include: catalyst poisoning, formic acid crossover from the anode to the cathode through the membrane, restrictive diffusion barriers within the gas diffusion layer, and dehydration of the membrane. Passive DFAFCs also present challenges in materials selection, MEA assembly, fuel management, low electrical resistance current collection, robust integration of the array or stack, and methods for manufacture.

It is desirable to provide a passive PEM fuel cell design applicable to at least a DFAFC that addresses at least some of the challenges in the prior art.

SUMMARY

According to an aspect of the invention, there is provided a passive direct formic acid fuel cell comprising: a cathode; an anode; and a membrane electrode assembly between the anode and the cathode. The anode comprises a body having an inlet at a first end and an outlet at a second end opposite the first end; and a flow channel in the body that is fluidly coupled to and extends between the inlet and the outlet. The anode body has an upstream section comprising an upstream portion of the flow channel and a downstream section comprising a downstream portion of the flow channel, wherein the downstream section has a higher flow channel volume density than the upstream section. The flow channel can have a serpentine flow pattern with interconnected transverse and longitudinal flow channel segments, wherein a pitch between traverse flow channel segments is higher in the upstream section than in the downstream section. Alternatively, the flow channel volume density of the anode body can increase continuously from the first end to the second end.

According to another aspect of the invention, there is provided a passive direct formic acid fuel cell system comprising: a fuel cell stack, a fuel delivery reservoir, a fuel cartridge, and a manually actuated priming pump. The fuel cell stack comprises at least one of the aforementioned fuel cells wherein in an operational orientation the anode inlet of the fuel cell is at a top of the anode and the anode outlet is at a bottom of the anode. The fuel delivery reservoir is fluidly coupled to the anode inlet and located above the anode when the system is in the operational orientation; the reservoir is configured to provide a sufficient hydrostatic head of fuel such that fuel can flow from the reservoir and through the anode by gravity. The fuel cartridge is fluidly coupled to the anode outlet and located below the anode when the system is in the operational orientation and has a chamber for storing fuel and receiving unreacted fuel and reaction products from the anode. The manually actuated priming pump is fluidly coupled at an intake end to the fuel cartridge and at a discharge end to the fuel delivery reservoir.

According to yet another aspect of the invention there is provided a check valve for fluidly communicating with an anode inlet of the fuel cell and a fuel source. The check valve comprises: a tubular section having a first end for fluidly coupling to the anode inlet and a second end for fluidly coupling to the fuel source; and a wick positioned in the tubular section such that the interior of the tubular section is filled with liquid when the wick is wetted, thereby impeding the flow of gas in an upstream direction through the check valve and allowing the flow of liquid in a downstream direction through the check valve and into the anode inlet. The wick can have a wetting angle of less than 90 degrees, and for example, can be composed of Lyocell™.

This check valve can be incorporated into passive direct formic acid fuel cell system that also comprise a fuel cell stack comprising at least one formic acid fuel cell.

According to another aspect of the invention, there is provided a passive formic acid fuel cell system comprising: a fuel cell stack, a fuel cartridge, and a manually actuated priming pump. The fuel cell stack comprises at least one formic acid fuel cell. The fuel cell comprises an anode, a cathode and a membrane electrode assembly in between the anode and the cathode, wherein the anode has a flow channel with an anode inlet fluidly communicable with a formic acid fuel source, and an anode outlet. The fuel cartridge is in fluid communication with the anode outlet, and comprising a chamber for storing fuel and receiving unreacted fuel and reaction products from the anode; and at least one vent in fluid communication with gas inside the chamber. The manually actuated priming pump is in fluid communication with the fuel cartridge and anode inlet and is configured to pump fuel in the fuel cartridge to the anode.

The fuel cartridge can comprise at least two vents including a first vent located in the vicinity of a first end of the chamber and a second vent located in the vicinity of a second end of the chamber that is opposite the first end. The vents are covered by a gas permeable and liquid impermeable material, thereby allowing the fuel cartridge to vent gas irrespective of its orientation, and to impede leakage of liquid when the vents are submerged. In particular, the vents can be covered by a hydrophobic and oleophobic material that is selected from a group consisting of polytetrafluoroethylene and polyvinylidene fluoride.

The fuel cartridge can further comprise a drain port, a porous weight having a negative buoyancy in formic acid fuel, and a flexible drain tube having a discharge end in fluid communication with the drain port and an intake end attached to the weight such that the intake end is in fluid communication with formic acid fuel in the chamber irrespective of the orientation of the fuel cartridge. The fuel cartridge can also comprise a vent port located at a bottom end of the chamber, a float having a positive buoyancy in formic acid fuel, and a vent tube having a discharge end fluidly coupled to the vent port and an intake end coupled to the float such that the intake end is in fluid communication with gas inside the chamber.

The fuel cartridge can further comprises a drain port, a porous weight having a negative buoyancy in formic acid fuel, and a flexible drain tube having a discharge end in fluid communication with the drain port and an intake end attached to the weight such that the intake end is in fluid communication with formic acid fuel in the chamber irrespective of the orientation of the fuel cartridge. The vent tube and drain tube can be coupled together such that the porous weight is located in the vicinity of the float with the drain tube intake end is in fluid communication with formic acid fuel in the vicinity of the fuel surface. Alternatively, the vent tube and drain tube can be coupled together such that the porous weight is suspended below the float by a selected length of drain tube with the drain tube intake end in fluid communication with formic acid fuel at a selected depth below the fuel surface.

BRIEF DESCRIPTION OF THE DRAWINGS

FIGS. 6(a) to (c) are schematic sectioned side views of alternate embodiments of the fuel cartridge, wherein FIG. 6(a) shows a fuel cartridge comprising uncoupled drain and vent tubes, FIG. 6(b) shows a fuel cartridge comprising coupled drain and vent tubes wherein the inlets of the drain and tube are both floating at the surface of the fuel; and FIG. 6(c) shows a fuel cartridge comprising coupled drain and vent tubes, wherein the vent tube inlet is floating at the surface of the fuel and the drain tube inlet is floating under the surface of the fuel.

DETAILED DESCRIPTION

Figure 1:
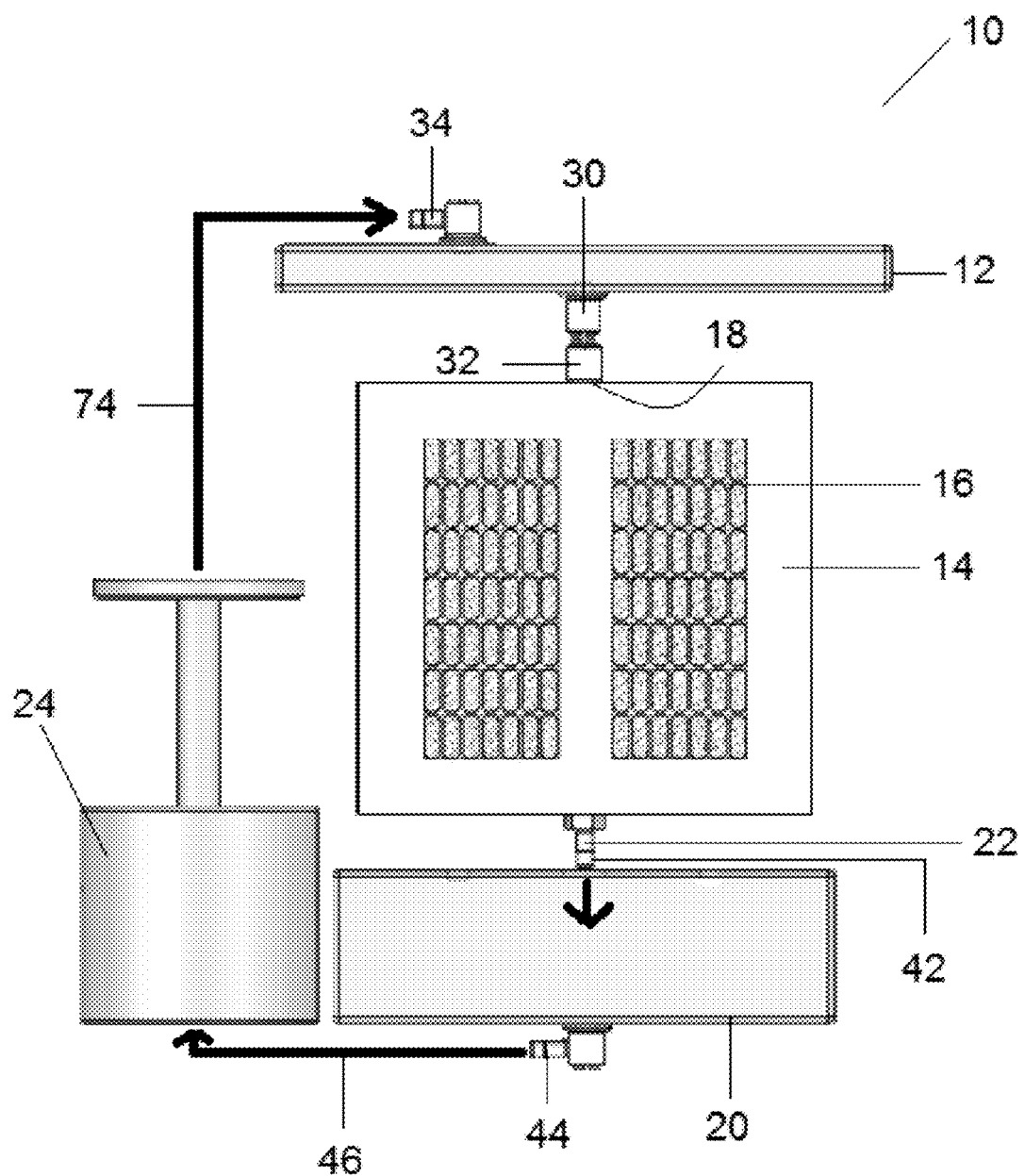
FIG. 1 is a schematic of a passive DFAFC system according to one embodiment of the invention.

Embodiments of the invention described herein relate generally to a DFAFC system, i.e. a formic acid fuel cell system that does not have any electrically powered components that run off electricity produced by a fuel cell in the system. The system comprises a fuel cell having a gravity fuel feed and a passive oxidant breathing design, wherein a fuel delivery reservoir is positioned above an anode of the fuel cell, and gravity feeds a formic acid fuel from the fuel delivery reservoir into a fuel inlet at the top of the anode, through a fuel flow channel, and out of a fuel outlet at the bottom of the anode. Because fuel will flow constantly into the anode provided there is a sufficient hydrostatic head of fuel in the fuel feed reservoir, the need for motorized dosing is eliminated from this system. In some embodiments, a manually-operated priming pump is provided to feed fuel from a separate fuel source into the fuel delivery reservoir. In some embodiments, the fuel source can be a vented fuel cartridge that is fluidly coupled to the fuel outlet to receive unreacted fuel from the fuel cell, which can be recirculated back to the fuel cell via the priming pump. In some embodiments, a capillary wick check valve can be provided between the fuel reservoir and the anode inlet, which allows liquid formic acid fuel to flow into the anode and impedes gases from flowing out of the anode via the inlet. Such a check valve does not require a cracking pressure to be overcome to open the valve, which can be advantageous in a passive DFAFC design where fuel flow pressure is relatively low. In some embodiments, the anode flow channel can be provided with a downstream section that has a higher flow channel volume density than an upstream section; in particular, the flow channel volume density of the downstream is selected to accommodate product carbon dioxide that is produced during electrochemical reaction in the fuel cell, thereby maintaining a low pressure drop in the anode.

According to a first embodiment of the invention and referring to FIGS. 1 to 4, a passive direct formic acid fuel cell system 10 generally comprises a fuel reservoir 12, a fuel cell stack comprising a fuel cell 14 located below the fuel reservoir 12 and having an anode 16 with an inlet 18 in fluid communication with the fuel reservoir 12, a fuel cartridge 20 located below the fuel cell 14 and fluidly coupled to an outlet 22 of the anode 16, and a manual priming pump 24 fluidly coupled to the fuel cartridge 20 and the fuel reservoir 12 for circulating fuel from the fuel cartridge 20 to the fuel reservoir 12. The fuel cell system 10 is designed to operate using air as the oxidant and a relatively high concentration of formic acid as the fuel, such as 10M or above and typically in the order of about 12-18M.

In this embodiment, the fuel cell stack has one fuel cell 14; however the fuel cell stack can comprise multiple fuel cells (not shown), in which case a fuel feed manifold (not shown) is provided to deliver fuel from the fuel reservoir 12 to the anode in each fuel cell, and a fuel discharge manifold (not shown) is provided to feed unreacted fuel and reaction products from the anode in each fuel cell to the fuel cartridge 20. The manifolding can be configured to deliver fuel to each anode in a parallel flow arrangement, such that each of the fuel cells will receive the same starting concentration of the formic acid fuel.

The fuel cell 14 comprises an air cathode (not shown), the anode 16, and a membrane electrode assembly ("MEA", not shown) sandwiched between the anode 16 and cathode. The fuel cell 14 is electrically coupled to an electrical circuit by an electrical bus (not shown). The MEA is a Nafion™ based assembly having anode and cathode graphite diffusion layers (GDL). Catalyst materials can be those known in art such as Pd black, or a PtSn alloyed catalyst of a loading sufficient to meet the power output requirements of the fuel cell 14. As the MEA and the cathode are based on designs well known in the art, they are not discussed in detail here. Alternatively, other types of MEAs using different membranes, catalyst materials and GDLs known in the art can be used, provided they are suitable for use in a passive DFAFC application.

Figure 2:
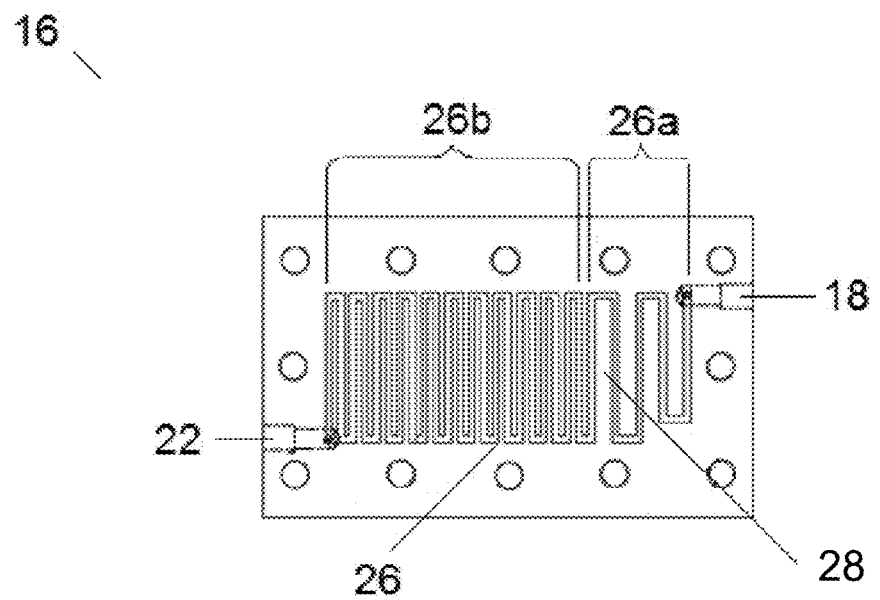
FIG. 2 is a plan view of an anode of the DFAFC system comprising a serpentine fuel flow channel.

Referring particularly to FIG. 2, the anode 16 has a planar design and has a generally rectangular plate body composed of a formic acid compatible material such as graphitic-based and amorphous carbon conductive materials. A serpentine flow channel 26 is formed in the anode body and extends from the inlet 18 to the outlet 22. Because the fuel feed is provided by gravity, the fuel cell 14 is oriented so that the anode inlet 18 is at the top of the anode 16 and the anode outlet 22 is at the bottom of the anode 16 (the dimension of the fuel cell body longitudinally extending between the top and the bottom of the anode is herein referred to as the "height" and the dimension that extends transversely across the anode is herein referred to as the "width").

The internal flow channel architecture is designed to adequately distribute two-phase fluid flow across the active surface area at inlet flow rates less than 10 $\mu L/min/cm^2$ and to address fuel crossover issues in a constant flow operation using relatively high formic acid concentrations. The serpentine pattern is designed to accommodate the greatly varying flow rate in a direct formic acid fuel cell, which results from liquid-phase formic acid being converted to gaseous carbon dioxide. For example, a fuel cell of 8.7 $cm^2$ operating at 100 $mA/cm^2$ will require 0.054 mL/min of 10 M formic acid at two times the stoichiometric value; this will increase by ~6.1 sccm, or roughly 112 times. This increased flow must be managed in order to maintain low pressure drop, and is accomplished primarily by increasing the flow channel volume density in the anode plate from inlet to outlet. In particular, the anode flow channel 26 is divided into two sections, namely an upstream section 26a and a downstream section 26b, wherein the downstream section 26b has a flow channel volume density that is higher than the flow channel volume density of the upstream section 26a. This is achieved by providing a serpentine flow channel with the longitudinal spacing 28 (pitch) between transverse channel portions that are larger in the upstream section 26a than the downstream section 26b, as well as providing deeper flow channels in the downstream section 26b. The higher channel volume density in the downstream section 26b is designed to accommodate product carbon dioxide that is produced by the electrochemical reaction, thereby reducing the effects of the product carbon dioxide on pressure drop inside the anode.

The dimensions of the upstream and downstream sections 26a, 26b are selected based on the approximate location in the anode where a significant amount of carbon dioxide is produced. While the serpentine flow pattern in this embodiment is shown with two flow channel sections 26a, 26b having discretely different flow channel volume densities, alternative embodiments (not shown) can feature a flow channel design wherein the channel volume density increases continuously in the downstream (and downwards) direction, or increases in finer discrete increments in the downstream direction. Also, alternative embodiments can feature different means for increasing the volume density between the upstream and downstream sections 26a, 26b, e.g. by varying the channel cross-sectional area or by varying the pitch between transverse channel portions, as well as channel length, width, and height depending on the mass transfer requirements in the local environment.

The fuel delivery reservoir 12 is positioned above the anode 16 and has an outlet 30 fluidly coupled to the anode inlet 18 by a capillary wick check valve 32, and an inlet 34 fluidly coupled to the priming pump 24. Because of the passive nature of the fuel cell system 10, the height of the reservoir 12 relative to the anode inlet 18 and the hydrostatic head of fuel inside the reservoir 12 will determine the flow pressure and flow rate through the anode 16. In order to maintain a relatively consistent fuel pressure and flow rate, the height differential between a full and empty reservoir 12 is minimized by selecting the fuel reservoir 12 height to be relatively small relative to its width and depth. A vent (not shown) is provided in the fuel delivery reservoir 12 is provided to admit air into the reservoir as fuel is delivered to the fuel cell 14.

The capillary wick check valve 32 comprises a tubular section that is configured to connect at its respective ends to the reservoir outlet 30 and anode inlet 18 (e.g. by threaded connections). A Lyocell™ wick is mounted inside the tubular section such that when wetted, the tubular section will be filled with liquid fuel. In this condition, the liquid fuel will still flow downwards through the check valve 32 due to the hydrostatic head of fuel in the reservoir 12, but will block upwards flow of gases from the anode 16, e.g. product carbon dioxide. In effect, the tubular section and Lyocell™ wick act as a check valve that has no "cracking pressure" to overcome unlike conventional mechanical check valves. Although Lyocell™ is a particularly suitable material for the wick, other materials having a wetting angle of less than 90 degrees can be used as the wick.

Figure 3A:
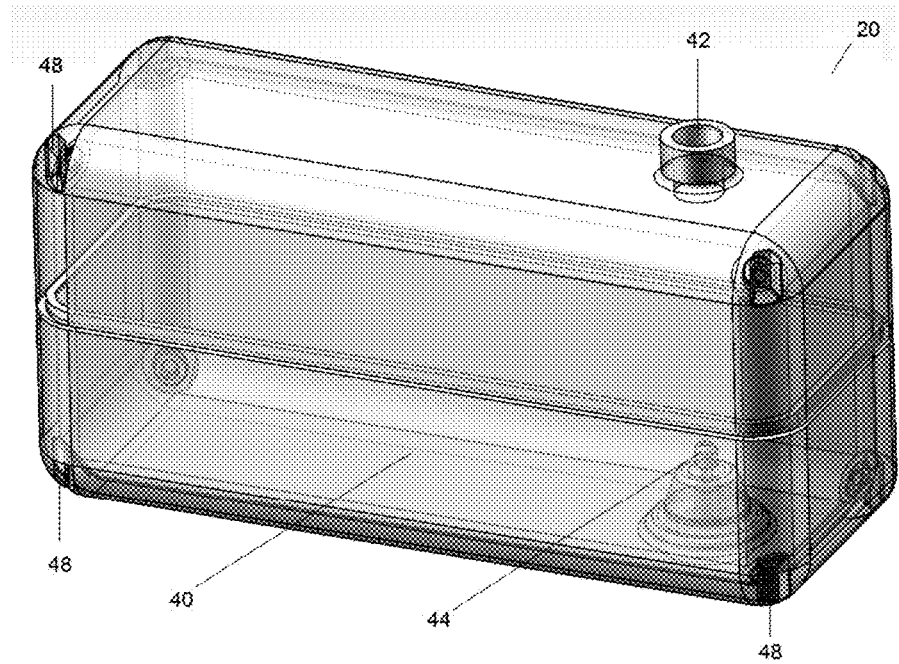
FIGS. 3(a) and (b) are perspective and side transparent views of a fuel cartridge of the DFAFC system.
Figure 3B:
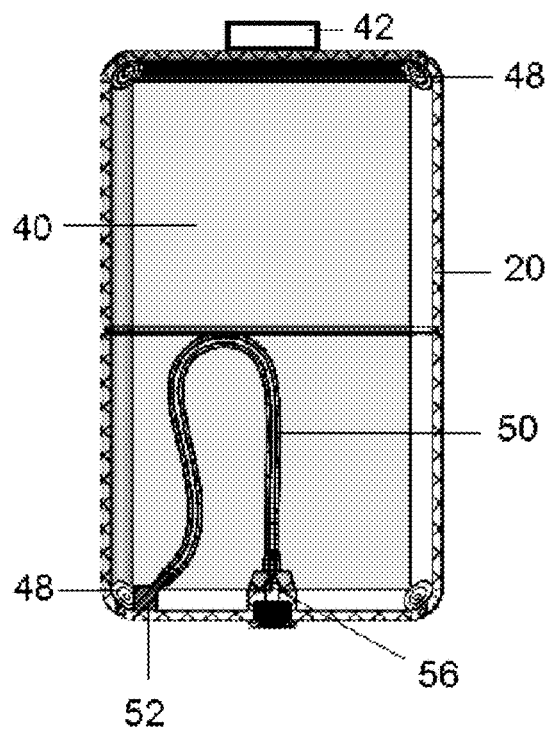

Referring particularly to FIGS. 3(a) and (b), the fuel cartridge 20 has a chamber 40 for storing and collecting fuel, that has an inlet port 42 in fluid communication with the anode outlet 22, and an outlet port 44 in fluid communication with the priming pump 24 via a fuel conduit 46. The inlet port 42 can be used to fill the fuel cartridge 20 with fuel when it is not coupled to the anode 16. When the fuel cartridge 20 is coupled to the anode 16, unreacted fuel and reaction products like carbon dioxide will flow through the inlet port 42 into the chamber 40.

The fuel cartridge 20 further comprises a eight vents 48 each disposed at a corner of the cartridge 20 and which serve to vent carbon dioxide and other gaseous compounds (such as carbon monoxide resulting from the decarbonylation of formic acid) from the fuel cartridge 20, thereby separating theses gases from the unreacted liquid fuel and allowing the fuel to be recirculated back into the anode 16. The fuel cartridge 20 is designed to be orientation independent and suitable for mobile system applications such as a portable charger, and thus at any given orientation at least one of the vents 48 will be in gaseous communication with the inside of the fuel cartridge 20 (assuming the fuel cartridge 20 is not completely full of liquid fuel) such that gases inside the cartridge 20 can escape. In order to prevent liquid from escaping from a submerged vent 48, the vents 48 are constructed of a known suitable superhydrophobic and oleophobic material that is permeable to gases but does not react with formic acid. Examples of such materials include polytetrafluoroethylene and polyvinylidene fluoride. The vents 48 are designed to withstand pressures caused by a full cartridge of liquid formic acid, and for example, can be designed to withstand pressures of up to 95 kPa. The hydrophobic and oleophobic nature of the vents 48 prevents fuel from escaping the fuel cartridge 20 through the vents 48, whilst allowing gaseous compounds within the fuel cartridge 20 to permeate through the vents 48.

The fuel cartridge 20 further comprises a flexible drain tube 50 inside the chamber 40 that is fluidly coupled at a discharge end to the outlet port 44 and at an opposite intake end to a porous drain tube weight 52, which can be a sintered metal disc or a porous polymer disc. The weight 52 will cause the intake end of the drain tube to move to the lowest part of the fuel cartridge 20 regardless of the fuel cartridge 20 orientation, thereby ensuring that the drain tube intake end is always in fluid communication with liquid fuel while there is fuel inside the chamber 40.

Alternatively, the fuel cartridge 20 can be provided without the drain tube 50 and weight 52, in which case fuel can be drawn from the fuel cartridge 20 when it is in the upright configuration.

Figure 4A:
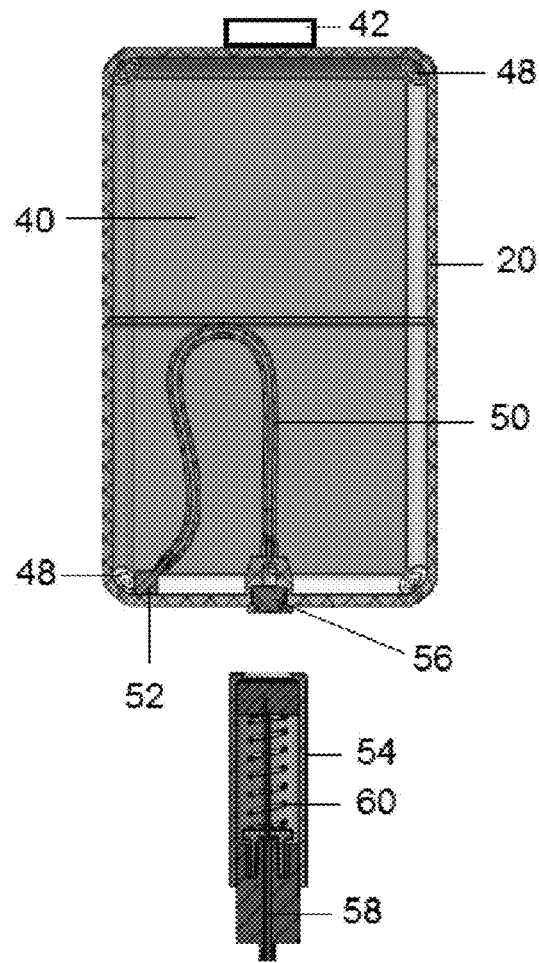
FIGS. 4(a) and (b) are sectioned side views of a connector for mechanically and fluidly coupling a fuel line to a fuel outlet of the fuel cartridge shown in FIGS. 3(a) and (b), wherein the connector is shown uncoupled from the cartridge in FIG. 4(a) and coupled to the cartridge in FIG. 4(b).
Figure 4B:
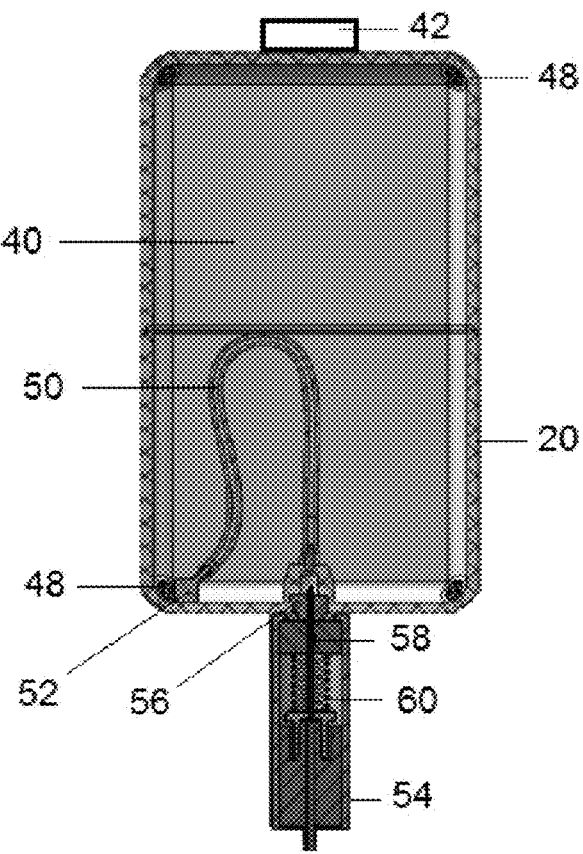

Referring now to FIGS. 4(a) and (b), the outlet port 44 is configured to engage a connecting end 54 of the fuel conduit 46 such that the chamber 40 is in fluid communication with the fuel conduit 46 when the connecting end 54 is connected to the outlet port 44, and the outlet port 44 is fluidly sealed when the connecting end 54 is not connected thereto. In this embodiment, the outlet port 44 is provided with a cartridge septum 56, and the connecting end 54 is provided with a cannula assembly, comprising a non-coring cannula 58 and a septum return spring 60. The cannula 58 has a non-coring tip geometry such as a deflected point or a truncated cone. The cartridge septum 56 is configured to receive the cannula 58 and can be an ethylene propylene diene monomer (EPDM) type septum as is known in the art, other known septums such as a Merlin Microseal™ type septum. The septum return spring 60 is extended when the connecting end 54 is uncoupled thereby causing the cannula 58 to be shrouded. When the connecting end 54 contacts the outlet port 44, the return spring is compressed, thereby exposing the cannula 58 and allowing the cannula 58 to pierce the septum 56.

Figure 5A:
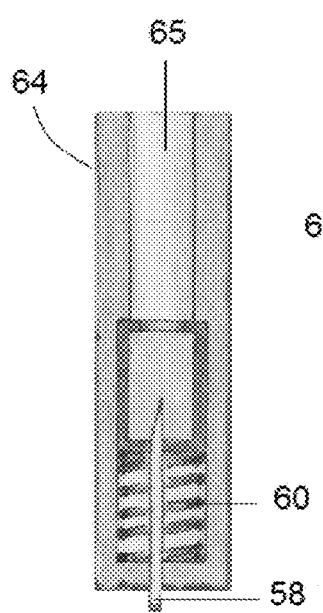
FIGS. 5(a) to (c) are side sectioned detailed views of three different embodiments of the connector for coupling the fuel line to the fuel cartridge outlet.
Figure 5B:
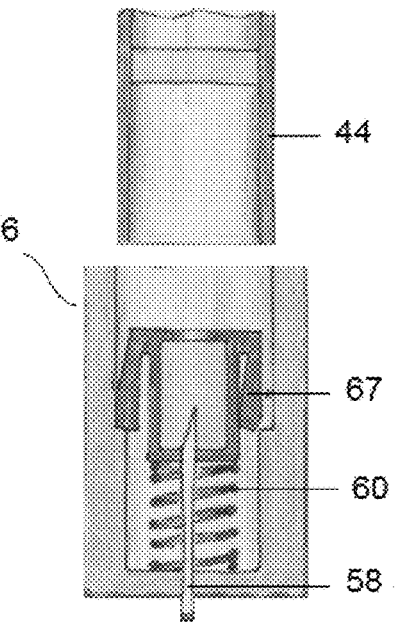
Figure 5C:
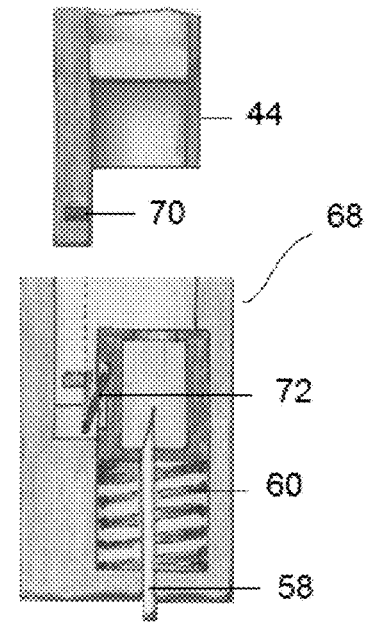

Referring to FIGS. 5(a) to (c), the connecting end 54 can be optionally provided with one of a number of different safety interlocks 64, 66, 68 to limit access to the cannula 58. Alternatively, the cannula 58 can be provided with a blunt end to minimize injury to a user. In FIG. 5(a), the safety interlock 64 comprises a connecting end with a barrel 65 having a diameter that is too small for a finger to reach the cannula 58. In FIG. 5(b), the safety interlock 65 comprise "snap fingers" 67 that are biased against an inner wall of the connecting end 54 thereby securing the cannula 58 in a recessed position. The outlet port 44 is configured to fit inside the barrel of the connecting end 54 and over the safety interlock 65 such that the snap fingers 67 are dislodged, thereby securing the connecting end 54 to the outlet 44. In FIG. 5(c), the wall of the outlet port 44 comprises a magnet 70 that is attracted to magnet 72 of the connecting end 54 when the outlet port 44 is fit within the barrel of the connecting end 54.

Referring back to FIG. 1, the priming pump 24 is fluidly coupled at an intake end to the fuel cartridge outlet port 44 via the fuel conduit 46, and at a discharge end to the fuel reservoir 12 via another fuel conduit 74. The priming pump 24 can be any type of manually actuated pump known in the art, including a positive displacement type pump. In this embodiment, the priming pump is a piston-type reciprocating positive displacement pump having an actuator in the form of a plunger connected to a piston.

The DFAFC system 10 described above is particularly useful in portable mobile applications, such as providing electricity to a portable charger. When the system 10 is not operating (is "off"), there will be no fuel in the reservoir, and an on/off switch (not shown) can be provided to electrically connect and disconnect the electrical circuit from the fuel cell stack. To begin operation of the system 10, the on/off switch is turned on to close the electrical circuit, and a user orients the system 10 into an upright position. The user actuates the priming pump 24 by pushing down the plunger, which causes a dose of fuel to be pumped from the fuel cartridge 20 into the fuel delivery reservoir 12. The fuel delivery reservoir 12 can be configured to hold a volume of fuel equivalent to one downward stroke of the plunger. Once the fuel delivery reservoir 12 contains fuel with sufficient hydrostatic head, the fuel will flow into the capillary wick check valve 32 and wet the wick therein. Once the wick is wetted, fuel will flow downwards into the anode 16 and through the anode flow channel 26. Electrochemical reaction will begin, which will produce electricity and carbon dioxide in accordance with the chemical reactions noted above. Unreacted fuel and product carbon dioxide will flow out of the anode 16 and into the fuel cartridge 20. The carbon dioxide will escape through non-submerged vents 48, and the unreacted fuel will mix with the fuel in the fuel cartridge 20 and be ready for circulation into the fuel cell 14.

Alternate Embodiments

The fuel cartridge 20 described above is particularly suitable for mobile system applications, and contains eight vents 48 at each corner to provide a measure of orientation independence. Alternatively, the vents 48 are not placed at the bottom of the fuel cartridge 20, and instead can be located at different locations such as near the top of the fuel cartridge 20; such alternative vent placement may be suitable in DFAFC systems that are used in stationary applications where orientation independence is not a priority.

In another embodiment of the fuel cartridge 20a and referring to FIG. 6(a), a floating vent tube 80 fluidly coupled to a single vent port 82 is provided instead of or in addition to the corner vents 48 provided in the fuel cartridge 20 of the first embodiment. A buoyant vent tube float 84 is attached to an intake end of the vent tube 80 and allows the intake end to float at the surface of the liquid fuel inside the fuel cartridge 20. A discharge end of the vent tube 80 is coupled to the vent port 82, which is located at the bottom of the fuel cartridge 20a. Because the intake end of the vent tube 80 is always floating at the fuel surface, it will be in fluid communication with gases inside the fuel cartridge 20a regardless of the orientation of the fuel cartridge 20a. Like the first embodiment, a fuel drain tube 50 is fluidly coupled to the fuel outlet port 44 and has an intake end weighted by the drain tube weight 52 such that the drain tube intake end is always in fluid communication with the fuel.

Another embodiment of the fuel cartridge 20b is shown in FIG. 6(b) and is similar to the embodiment shown in FIG. 6(a), except that the fuel drain tube 50 and vent tube 80 are coupled together, such that the drain tube's 50 intake end floats just below the surface of the fuel. The properties of the float 84 and weight 52 are selected to ensure that the vent tube's intake end remains afloat. Like the FIG. 6(a) embodiment, this arrangement should enable the vent tube's intake end to always be in fluid communication with gases inside the fuel cartridge 20*b*, and the drain tube 50's intake end to always be in fluid communication with fuel inside the fuel cartridge 20*b*.

Another embodiment the fuel cartridge 20*c* is shown in FIG. 6(*c*) and is similar to the embodiment shown in FIG. 6(*b*) except that the vent tube 82 and drain tube 50 are coupled so that drain tube 50's intake end is submerged more deeply than in the FIG. 6(*b*) embodiment. This can be achieved by attaching the drain tube 50 at its mid point to the float 84, and allowing the negative buoyancy of the weight 52 to cause the drain tube 50 intake end to sink.

Figure 7:
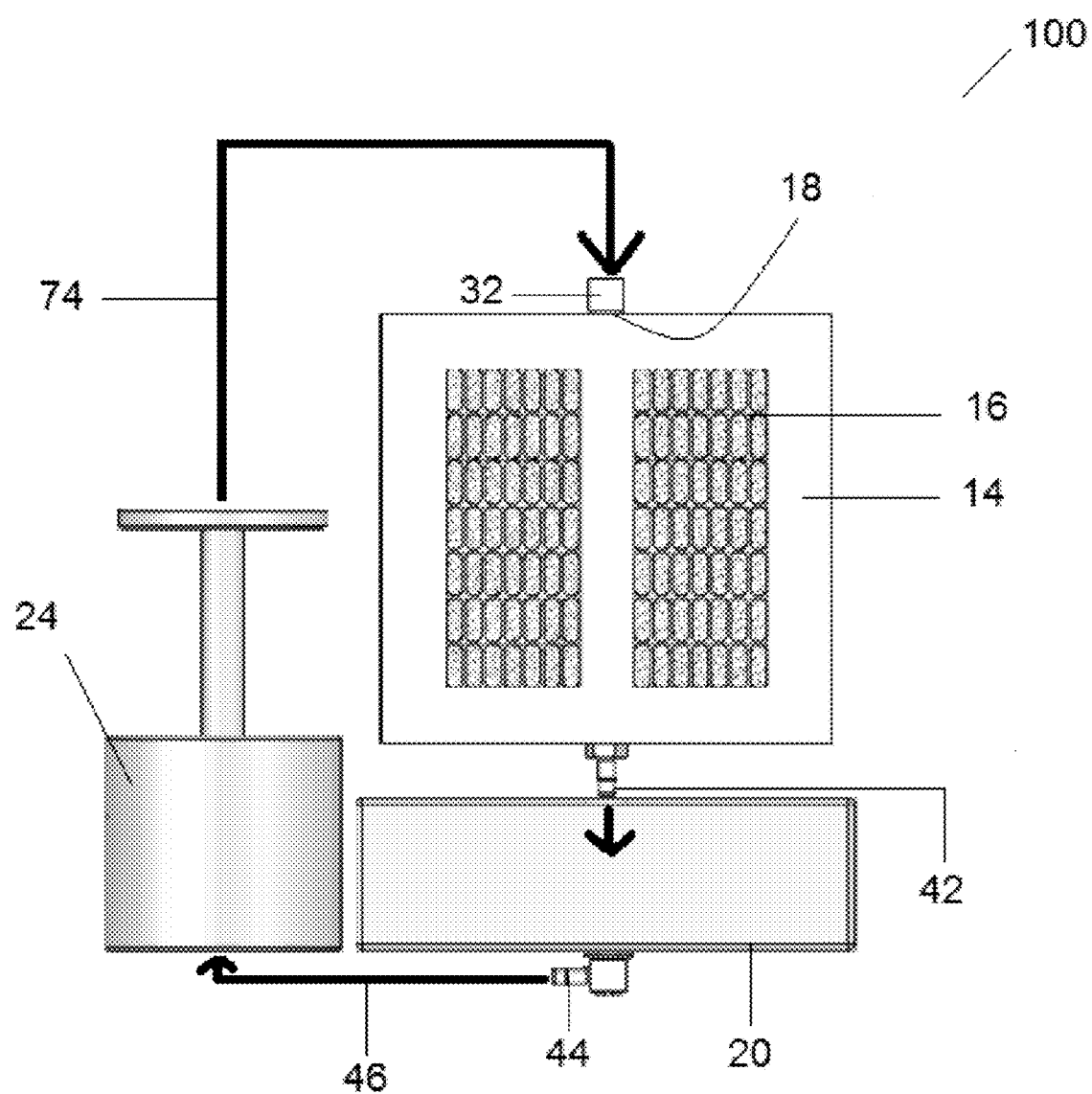
FIG. 7 is a schematic of a fuel cell system according to another embodiment wherein a fuel pump feeds fuel directly to an anode of the system.

According to another embodiment of the invention and referring to FIG. 7, a fuel cell system 100 is provided which resembles the fuel cell system 10 as shown in FIGS. 1 to 4, except that no fuel delivery reservoir is provided. In this alternative embodiment, fuel delivery pressure is not provided by a hydrostatic head of fuel above the anode, and instead, fuel delivery pressure is provided by the priming pump 24. In particular, an operator can actuate the pump to deliver fuel from the fuel cartridge 20 under pressure into the anode 16. More particularly, the pumping would prime the anode chamber of each fuel cell and allow each fuel cell to operate using the fuel that is retained within hydrophilic layers therein (e.g. in the GDL). Additional hydrophilic anode layers can be included to hold more fuel to extend runtime between manual priming.

Other embodiments of the fuel cell system will be apparent to one skilled in the art in view of the above disclosure. In particular, alternative embodiments of the fuel cell system can include only some of the features of the first embodiment of the fuel cell system 10. For example, a fuel cell system (not shown) can be provided that has all of the components of the first embodiment except for the capillary wick check valve; either no check valve is provided between the fuel reservoir 12 and the fuel cell 14, or another type of check valve known in the art and suitable for use in this system can be substituted. In another example, a fuel cell system (not shown) can be provided that has all of the components of the first embodiment, except that the anode does not feature two sections having different flow channel volume densities; in such an alternative embodiment, the anode design will be configured using a known flow channel architecture that will ensure that pressure drop inside the anode is within operational limits. In yet another example, a fuel cell system (not shown) can be provided wherein the fuel cartridge is not fluidly coupled to the anode 16 to receive unreacted fuel, and thus the fuel cell stack only receives fresh fuel from the fuel cartridge. This alternative embodiment of the fuel cartridge does not require a separate inlet and outlet, and instead, can be provided with a single port that can be used to both fill the cartridge and draw fuel from the cartridge.

In addition, alternative embodiments of the fuel cell system may include features in addition to the features of the first embodiment of the fuel cell system 10. In an example, a capillary wick check valve may be provided between the fuel cartridge 20 and the fuel cell 14. In another example, the fuel reservoir 12 may have an additional overflow valve that is fluidly coupled to the fuel cartridge 20, so that fuel may be re-directed back to the fuel cartridge 20 in the event that the fuel reservoir 12 is over-filled.

While the present invention is illustrated by description of various embodiments and while the illustrative embodiments are described in detail, it is not the intention of the applicant to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of the general concept. For example, while the embodiments described herein are directed specifically to DFAFC systems, aspects of the invention can be applied to other types of PEM fuel cell systems, as well as some flow batteries.

What is claimed is:

1. A passive direct formic acid fuel cell comprising: a cathode, an anode, and a membrane electrode assembly between the anode and the cathode wherein; the anode comprises a body having an inlet at a first end and an outlet at a second end opposite the first end, a flow channel in the body that is fluidly coupled to and extends between the inlet and the outlet, the anode body has an upstream section comprising an upstream portion of the flow channel and a downstream section comprising a downstream portion of the flow channel, and the downstream section has a higher flow channel volume density than the upstream section, a fuel cell stack wherein; at least one fuel cell wherein in an operational orientation the anode inlet of the fuel cell is at a top of the anode and the anode outlet is at a bottom of the anode, a fuel delivery reservoir fluidly coupled to the anode inlet and located above the anode when the system is in the operational orientation, the reservoir configured to provide a sufficient hydrostatic head of fuel such that fuel can flow from the reservoir and through the anode by gravity, a fuel cartridge fluidly coupled to the anode outlet and located below the anode when the system is in the operational orientation and having a chamber for storing fuel and receiving unreacted fuel and reaction products from the anode, and a manually actuated priming pump fluidly coupled at an intake end to the fuel cartridge and at a discharge end to the fuel delivery reservoir, the fuel cartridge further comprising; at least one vent in fluid communication with gas inside the chamber and a manually actuated priming pump in fluid communication with the fuel cartridge and anode inlet and configured to pump fuel in the fuel cartridge to the anode, the fuel cartridge further comprising; at least two vents including a first vent located in the vicinity of a first end of the chamber and a second vent located in the vicinity of a second end of the chamber that is opposite the first end and the vents are covered by a gas permeable and liquid impermeable material, thereby allowing the fuel cartridge to vent gas irrespective of its orientation, and to impede leakage of liquid when the vents are submerged.

2. The fuel cell as claimed in claim 1 further comprising:
the flow channel has a serpentine flow pattern with an interconnected transverse and longitudinal flow channel segments, and
a pitch between the traverse flow channel segments is higher in the upstream section than in the downstream section.

3. The fuel cell system as claimed in claim 1 further comprising:
the flow channel volume density of the anode body increases continuously from the first end to the second end.

4. A fuel cell as claimed in claim 1 additionally comprising:
a check valve for fluidly communicating with an anode inlet of the fuel cell;
the check valve comprising;

a tubular section having a first end for fluidly coupling to the anode inlet and a second end for fluidly coupling to the fuel source, and a wick positioned in the tubular section such that the interior of the tubular section is filled with liquid when the wick is wetted, thereby impeding the flow of gas in an upstream direction through the check valve and allowing the flow of liquid in a downstream direction through the check valve and into the anode inlet.

5. The check valve as claimed in claim 4 wherein:
the wick has a wetting angle of less than 90 degrees.

6. The check valve as claimed in claim 4 wherein: the wick is composed of Lyocell.

7. The fuel cell system as claimed in claim 1 wherein:
the vents are covered by a hydrophobic and oleophobic material.

8. The fuel cell system as claimed in claim 7 wherein:
the hydrophobic and oleophobic material is selected from
a group consisting of polytetrafluoroethylene and polyvinylidene fluoride.

9. The fuel cell system as claimed in claim 1 wherein:
the fuel cartridge further comprises;
a drain port,
a porous weight having a negative buoyancy in formic acid fuel, and
a flexible drain tube having a discharge end in fluid communication with the drain port and an intake end attached to the weight such that the intake end is in fluid communication with formic acid fuel in the chamber irrespective of the orientation of the fuel cartridge.

10. The fuel cell system as claimed in claim 1 wherein:
the fuel cartridge further comprises;
a vent port located at a bottom end of the chamber,
a float having a positive buoyancy in formic acid fuel,
a vent tube having a discharge end fluidly coupled to the vent port, and
an intake end coupled to the float such that the intake end is in fluid communication with gas inside the chamber.

11. The fuel cell system as claimed in claim 1 wherein: the fuel cartridge further comprises; a drain port, a porous weight having a negative buoyancy in formic acid fuel, a flexible drain tube having a discharge end in fluid communication with the drain port and an intake end attached to the weight such that the intake end is in fluid communication with formic acid fuel in the chamber irrespective of the orientation of the fuel cartridge, a vent port located at a bottom end of the chamber, a float having a positive buoyancy in formic acid fuel, a vent tube having a discharge end fluidly coupled to the vent port, and an intake end coupled to the float such that the intake end is in fluid communication with gas inside the chamber, and further comprising the vent tube and drain tube are coupled together such that the porous weight is located in the vicinity of the float with the drain tube intake end in fluid communication with formic acid fuel in the vicinity of the fuel surface.

12. The fuel cell system as claimed in claim 11 wherein:
the vent tube and drain tube are coupled together such that the porous weight is suspended below the float by a selected length of drain tube with the drain tube intake end in fluid communication with formic acid fuel at a selected depth below the fuel surface.

13. A passive direct formic acid fuel cell comprising: a cathode, an anode, and a membrane electrode assembly between the anode and the cathode wherein; the anode comprises a body having an inlet at a first end and an outlet at a second end opposite the first end, a flow channel in the body that is fluidly coupled to and extends between the inlet and the outlet, the anode body has an upstream section comprising an upstream portion of the flow channel and a downstream section comprising a downstream portion of the flow channel, and the downstream section has a higher flow channel volume density than the upstream section, fuel cell stack wherein; at least one fuel cell wherein in an operational orientation the anode inlet of the fuel cell is at a top of the anode and the anode outlet is at a bottom of the anode, a fuel delivery reservoir fluidly coupled to the anode inlet and located above the anode when the system is in the operational orientation, the reservoir configured to provide a sufficient hydrostatic head of fuel such that fuel can flow from the reservoir and through the anode by gravity, a fuel cartridge fluidly coupled to the anode outlet and located below the anode when the system is in the operational orientation and having a chamber for storing fuel and receiving unreacted fuel and reaction products from the anode, and a manually actuated priming pump fluidly coupled at an intake end to the fuel cartridge and at a discharge end to the fuel delivery reservoir, the fuel cartridge further comprising; at least one vent in fluid communication with gas inside the chamber and a manually actuated priming pump in fluid communication with the fuel cartridge and anode inlet and configured to pump fuel in the fuel cartridge to the anode, drain port, a porous weight having a negative buoyancy in formic acid fuel, and a flexible drain tube having a discharge end in fluid communication with the drain port and an intake end attached to the weight such that the intake end is in fluid communication with formic acid fuel in the chamber irrespective of the orientation of the fuel cartridge.

14. The fuel cell system as claimed in claim 13 wherein:
the fuel cartridge further comprises;
a vent port located at a bottom end of the chamber,
a float having a positive buoyancy in formic acid fuel,
a vent tube having a discharge end fluidly coupled to the vent port, and
an intake end coupled to the float such that the intake end is in fluid communication with gas inside the chamber, and further comprising
the vent tube and drain tube are coupled together such that the porous weight is located in the vicinity of the float with the drain tube intake end in fluid communication with formic acid fuel in the vicinity of the fuel surface.

15. The fuel cell system as claimed in claim 14 wherein:
the vent tube and drain tube are coupled together such that the porous weight is suspended below the float by a selected length of drain tube with the drain tube intake end in fluid communication with formic acid fuel at a selected depth below the fuel surface.

16. A passive direct formic acid fuel cell comprising: a cathode, an anode, and a membrane electrode assembly between the anode and the cathode wherein; the anode comprises a body having an inlet at a first end and an outlet at a second end opposite the first end, a flow channel in the body that is fluidly coupled to and extends between the inlet and the outlet, the anode body has an upstream section comprising an upstream portion of the flow channel and a downstream section comprising a downstream portion of the flow channel, and the downstream section has a higher flow channel volume density than the upstream section, a fuel cell stack wherein; at least one fuel cell wherein in an operational orientation the anode inlet of the fuel cell is at a top of the anode and the anode outlet is at a bottom of the anode, a fuel delivery reservoir fluidly coupled to the anode inlet and located above the anode when the system is in the operational orientation, the reservoir configured to provide a sufficient hydrostatic head of fuel such that fuel can flow from the reservoir and through the anode by gravity, a fuel cartridge fluidly coupled to the anode outlet and located below the anode when the system is in the operational orientation and having a chamber for storing fuel and receiving unreacted fuel and reaction products from the anode, and a manually actuated priming pump fluidly coupled at an intake end to the fuel cartridge and at a discharge end to the fuel delivery reservoir, the fuel cartridge further comprising; at least one vent in fluid communication with gas inside the chamber and a manually actuated priming pump in fluid communication with the fuel cartridge and anode inlet and configured to pump fuel in the fuel cartridge to the anode, a vent port located at a bottom end of the chamber, a float having a positive buoyancy in formic acid fuel, a vent tube having a discharge end fluidly coupled to the vent port, and an intake end coupled to the float such that the intake end is in fluid communication with gas inside the chamber.

* * * * *